Patented Dec. 12, 1933

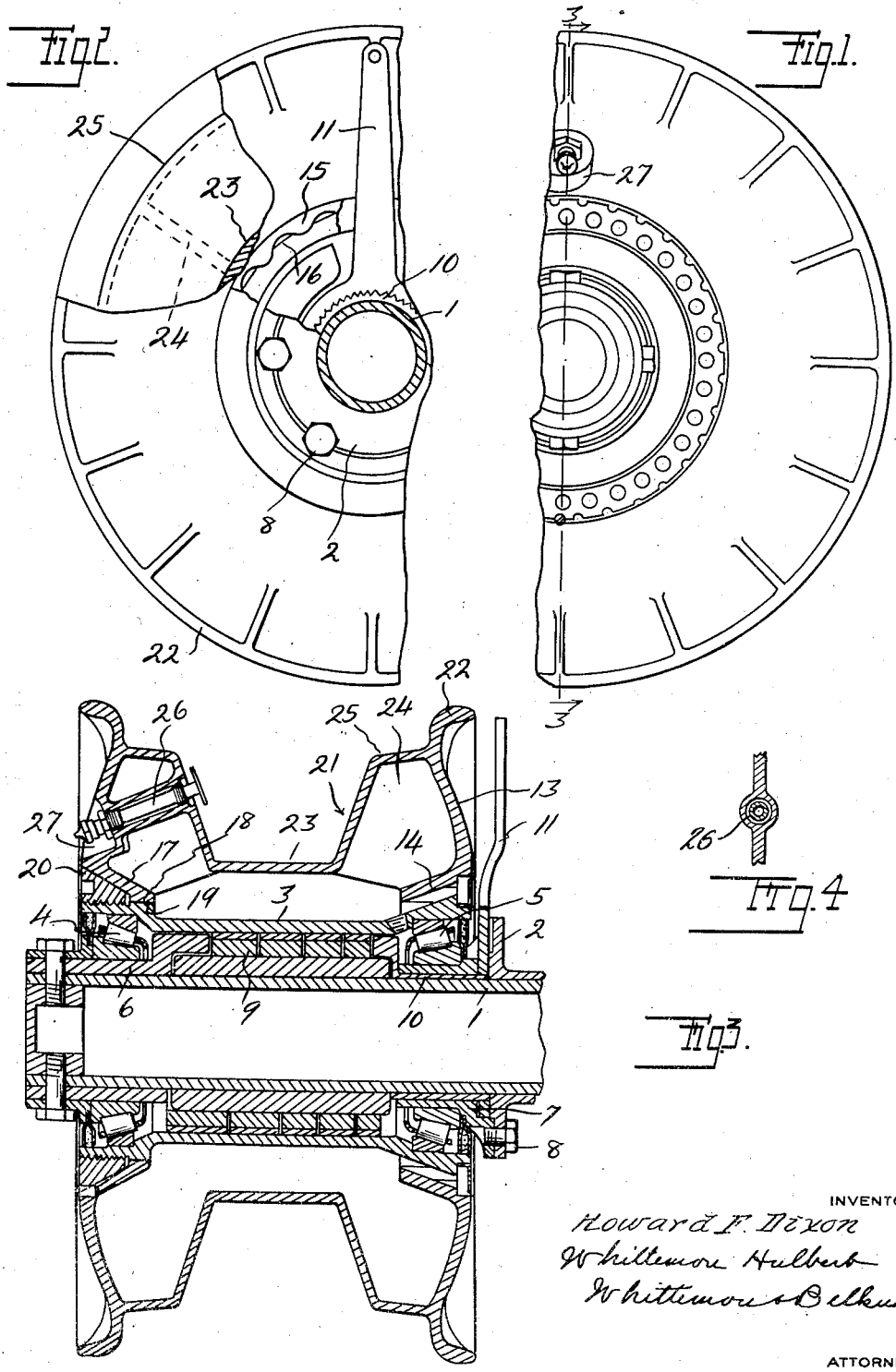

1,939,489

UNITED STATES PATENT OFFICE 1,939,489

WHEEL

Howard F. Dixon, Buffalo, N. Y., assignor to Kelsey - Hayes Wheel Corporation, Detroit, Mich., a corporation of New York Application May 19, 1930. Serial No. 453,801

8 Claims. (Cl. 301—5)

The invention relates to wheels and has for some of its objects to so construct the wheel that it is demountable and to construct the wheel with a drop center rim, which is adapted to receive a tire and which is substantially co-extensive with the body of the wheel. Other objects are to reinforce the rim and body portions of the wheel and to arrange the valve stem of the tire so that it is readily accessible for engagement with an air-chuck. Further objects of the invention will appear from an examination of the following description taken in connection with the drawing, in which Figures 1 and 2 are end views, partly broken away, of a wheel embodying my invention;

Figure 3 is a cross section on the line 3—3 of Figure 1.

Figure 4 is a sectional view taken on the line 4—4 of Figure 3.

The wheel embodying my invention is particularly adapted for use with aircraft and is also designed to receive a pneumatic tire having a cross sectional area which is large relative to its internal diameter.

As shown in the present instance, 1 is the axle which is fixedly secured to the supporting flange member 2 upon the aircraft. 3 is the hub having enlarged front and rear ends within which are located the anti-friction bearings 4 and 5, respectively, for supporting this hub. These bearings are mounted upon the supports 6 and 7, respectively, the support 6 being sleeved upon and fixedly secured to the front end of the axle 1 and the support 7 being secured to the flange member 2 as by means of the bolts 8. A suitable spiral braking element 9 is provided within the hub 3 and engageable with its inner face, one end of this braking element being engageable by a shoulder or abutment upon the support 6 and the other end being engageable by a shoulder or abutment upon the actuating member 10, which extends between the support 7 and the axle and is adapted to be rotated by the lever 11.

The wheel is of the demountable type and its body is formed by the front and rear side walls 12 and 13, respectively. The rear side wall has the forwardly tapered boss 14, the inner face of which is corrugated to provide the teeth 15 for engaging corresponding teeth 16 upon the rear enlarged end of the hub 3. The front wall has the boss 17 with the inner cylindrical face 18 for resting upon the cylindrical face 19 of the front enlarged end of the hub 3. The smallest diameter of the teeth 15 is greater than the diameter of the face 19 so that the wheel may be readily removed or applied. 20 is the conical nut having a rearwardly tapered face for engaging a correspondingly tapered face upon the boss 17, this nut being threaded upon the front portion of the enlarged front end of the hub 3.

21 is the drop center rim integral with the body of the wheel and having its side or tire retaining flanges 22 extended beyond the side walls 12 and 13 of the body and its channel 23 extending between these side walls and terminating at a point radially outward beyond the inner faces of the bosses 14 and 17, but at a distance such that the drop center rim is substantially co-extensive with the wheel body radially of the wheel. However, this drop center rim is radially spaced from the hub so that the heat generated by the application of the brakes is not conducted directly into the tire carried by the drop center rim.

24 are transverse reinforcing webs extending between and integral with the side walls of the channel and the side walls of the body. These webs also connect into the bosses at the inner edges of the body side walls and the lateral bead engaging portions 25 of the drop center rim. As shown in Figure 3, one of the webs is provided with an apertured boss 30 arranged to register with an opening in the front side wall of the channel 23 and also with an opening in the front side wall of the wheel body so as to provide for the passage therethrough of a valve stem 26 for a pneumatic tire. The stem 26 extends substantially at right angles to the side wall of the channel and has its outer end extending into the pocket 27 formed in the front side wall 12, so that it is readily accessible for engagement with an air-chuck.

What I claim as my invention is:

1. A wheel having side walls, a drop center rim with its channel extending between said side walls and integral transverse webs between said side walls and rim, one of said side walls, the adjacent wall of said channel, and one of said webs being formed for the passage of a tire valve stem.

2. A wheel having a body provided with axially spaced side walls, a drop center rim disposed between the side walls with the legs of the channel integrally connected with the side walls, and transverse reinforcing webs extending between the legs of the channel and the side walls and formed integral therewith.

3. A wheel having a body provided with axially spaced side walls, a drop center rim disposed between the side walls with the leg portions of the channel spaced from the side walls and having laterally projecting portions integrally connected to the side walls and terminating in outwardly extending side flanges, and transverse reinforcing webs located in the space between the legs of the channel and side walls and formed integral with the latter and with the laterally extending portions aforesaid.

4. A wheel having a body provided with axially spaced side walls, a drop center rim having its channel extending between the side walls in spaced relation thereto, transverse webs between the side walls and adjacent portions of the channel and formed integral therewith, one of said webs having an apertured boss arranged in alignment with openings in one of the legs of the channel and in one of said side walls permitting the passage therethrough of a valve stem.

5. A wheel having side walls, a substantially channel-shaped drop center rim having its channel disposed between said side walls with the leg portions thereof extending adjacent the latter walls, and transverse reinforcing webs connecting the said side walls with the leg portions aforesaid of the rim.

6. A wheel having a body provided with axially spaced side walls, a substantially channel-shaped drop center rim disposed between the side walls with the leg portions of the channel coextensive with the side walls in axial spaced relation thereto, and means for reinforcing the rim and side walls of the wheel body including reinforcing ribs interposed between the leg portions aforesaid and said side walls.

7. A wheel having side walls, a substantially channel-shaped drop center rim having its channel disposed between said side walls with the leg portions thereof spaced axially inwardly from the side walls, and ribs substantially coextensive with the leg portions and side walls radially of the wheel and connected to said walls and leg portions for reinforcing the same.

8. A wheel having side walls and a substantially channel-shaped drop center rim having its channel disposed between the side walls and having tire retaining flanges projecting beyond the side walls forming in effect radial extensions of the latter, and webs extending between the leg portions of the channel aforesaid and said side walls and connected thereto for reinforcing the same.

HOWARD F. DIXON.